US007298853B2

(12) United States Patent
Norris et al.

(10) Patent No.: US 7,298,853 B2
(45) Date of Patent: Nov. 20, 2007

(54) PARAMETRIC VIRTUAL SPEAKER AND SURROUND-SOUND SYSTEM

(75) Inventors: Elwood G. Norris, Poway, CA (US); James J. Croft, III, Poway, CA (US)

(73) Assignee: American Technology Corporation, San Diego, CA (US)

( * ) Notice: Subject to any disclaimer, the term of this patent is extended or adjusted under 35 U.S.C. 154(b) by 289 days.

(21) Appl. No.: 10/476,933

(22) PCT Filed: May 7, 2002

(86) PCT No.: PCT/US02/14486

§ 371 (c)(1),
(2), (4) Date: Jul. 19, 2004

(87) PCT Pub. No.: WO02/093773

PCT Pub. Date: Nov. 21, 2002

(65) Prior Publication Data

US 2004/0247140 A1 Dec. 9, 2004

(51) Int. Cl.
*H04B 3/00* (2006.01)
(52) U.S. Cl. .................... 381/77; 381/79; 381/310
(58) Field of Classification Search .................. 381/77, 381/79, 89, 109, 110, 160, 387, 310
See application file for complete search history.

(56) References Cited

U.S. PATENT DOCUMENTS 1,616,639 A  2/1927 Sprague

| 3,612,211 A | 10/1971 | Clark, III |
| 4,256,922 A | 3/1981 | Goerike |
| 4,823,908 A | 4/1989 | Tanaka et al. |
| 5,889,870 A | 3/1999 | Norris |
| 6,229,899 B1 | 5/2001 | Norris et al. |

FOREIGN PATENT DOCUMENTS

| EP | 0599250 | 6/1994 |
| WO | WO98/02978 | 1/1998 |
| WO | WO 01/08449 | 2/2001 |

OTHER PUBLICATIONS

Voneyama M et al. "the audio spotlight: an application of nonlinear interaction of sound waves to a new type of loudspeaker design" Journal of the Acoustical Society of America May 1983, vol. 73, No. 5.

*Primary Examiner*—Vivian Chin
*Assistant Examiner*—Con P. Tran
(74) *Attorney, Agent, or Firm*—Thorpe North & Western LLP

(57) ABSTRACT

A system for generating at least one remote virtual speaker location in connection with at least a partial reflective environment (12, 12, 14 or 15) in combination with an audio speaker for creating multiple sound effects including a virtual sound source from the reflective environment which is perceived by a listener (53) as an original sound source, by generating a primary direct audio output by emitting audio compression waves toward a listener, and generating a secondary indirect audio output from at least one virtual speaker (24, 25 or 26) remote from the audio speakers, by emitting ultrasonic sound from at least one parametric speaker (20, 21 or 22) associated with the audio speakers and oriented toward at least one reflective environment which is remote from the audio speakers.

11 Claims, 2 Drawing Sheets

PARAMETRIC VIRTUAL SPEAKER AND SURROUND-SOUND SYSTEM

BACKGROUND OF THE INVENTION

1. Field of the Invention

The present invention relates to sound systems, and more particularly to sound systems which utilize a parametric sound source to generate a virtual speaker from a reflecting surface.

2. Prior Art

The evolution of sound reproduction began with a simple sound source such as a horn loudspeaker acoustically coupled to a rotating cylinder which carried physical impressions of sound scribed into its surface. The emitted sound was very localized, propagating from the horn with a directional aspect oriented along the horn throat axis. As speakers became more sophisticated, stereophonic features were added in combination with use of multiple speaker systems, generating left and right or side-to-side dynamics to sound reproduction. Modern surround-sound systems capitalize on diverse speakers to generate both stereophonic output, as well as synchronized shifting of isolated sounds to individual speakers disposed around the listener. In this manner, for example, sound associated with motion picture display can develop greater realism by coordinating specific events on the screen with shifting sound propagation around the room from a variety of directions.

Because of the physiology of the ear, human hearing is amazingly capable of assigning a directional aspect to sound. This ability provides a continuous flow of information to the brain, supplying data which is assimilated in defining an individual's position and environment within a three-dimensional framework. Modern surround-sound systems simulate a desired three-dimensional environment by directing sound to the listener from various orientations, including front, side, back, floor and ceiling propagation. Such sounds include speaking voices from persons at differing positions, surrounding environmental sounds of nature such as water movement, wind, thunder, birds, animals, etc. Action scenes include synthesized audio effects for emphasizing mood dynamics of anxiety, fear, surprise, and pleasure, as well as sound effects for crash scenes, explosions, and a myriad of visual objects whose display on the screen is brought to life with multidirectional sound effects.

In order to implement effective surround-sound experiences as described above, conventional sound systems include many speakers, positioned around a room perimeter, including floor and ceiling. Typically, low frequency range woofers are located at the front of the room, or under the floor. Because these low frequency speakers have less directionality, their placement at a particular location in a room is not problematic. Indeed, the low range sound is difficult to ascribe to any direction when the room is reasonably small in dimension. Because of the large size of conventional dynamic speakers, location in the front of the room is generally more practical.

With high range frequencies, the directional aspect of sound propagation is enhanced. Tweeters, for example, can readily be detected as to source or orientation. Surround-sound systems supply these higher frequencies from smaller speakers which are dispersed at the sides and back of the room, enabling their beaming properties to simulate sound emanating from multiple directions as if in a natural environment. Physical displacement and positioning at wall and ceiling locations are facilitated by the smaller size of this speaker component.

Parametric speakers are also known for their highly directional character. U.S. Pat. No. 4,823,908 of Tanaka et. al. discloses that the derivation of audio output from a modulated ultrasonic carrier provides a more focused directivity, even at lower frequency ranges. FIG. 2 of the Tanaka '908 patent shows a conventional parametric system 8 oriented directly toward a listener 9, but suggests that ultrasonic db levels capable of generating desirable audio output could be at dangerous levels for human safety. Acoustic filters 10 and 20 are therefore applied along the audio path between the emitter and listener for substantially eliminating the ultrasonic component of the parametric output. Although reflective plates 19 are disclosed in Tanaka et. al. '908 (i.e. FIG. 16), their purpose appears to be lengthening the acoustic path and changing the direction of propagation of the ultrasonic and/or audio frequencies. Accordingly, these prior teachings with respect to parametric speakers do not point to significant differences in audio output between direct projection of parametric output toward a listener and indirect propagation of such audio output to a listener by reflection; except, perhaps, with respect to diminished or enhanced db level.

In accordance with this understanding, prior art systems for developing perception of sound sources from different directions would necessitate the placement of a speaker along a particular orientation and at a predetermined location. In order to obtain multiple directions as part of a surround-sound experience, multiple speakers (dynamic, electrostatic, parametric, etc.) at differing locations would be required. Therefore, the need to disperse speaker systems at a variety of positions within the listener's experience will generally necessitate more complex technical implementation. Speaker wires must extend from sound source to speaker hardware. For in-home theaters, retrofit of wiring may be expensive and/or detrimental to room decor. Efforts to avoid unsightly wiring may include FM wireless transmission systems which are very expensive and often problematic in operation. Even where new construction allows prewiring of surround-sound systems, limited adaptability exists because the speakers are fixed at certain locations, and are not subject to rapid relocation consonant with displacement of the sound. If a sense of movement is desired based on shifting a sound source, many speakers are required along the direction of movement, with complex circuitry to synchronize sound through the desired speaker devices. This fact simply increases the cost and complexity of developing more extensive surround-sound systems, particularly where multiple speakers and associated wiring and additional circuitry are required.

In short, the excessive cost and complexity of dynamic movement of the sound source has discouraged general commercial application beyond conventional surround-sound systems in environments other than public move theaters.

SUMMARY OF THE INVENTION

Briefly and in one general aspect, the present invention is realized in a method for providing multiple speaker locations around a listener. The method comprises the steps of a) generating primary audio output by emitting audio compression waves from audio speakers at the sound source which are oriented along a primary audio path directly toward the listener; b) generating secondary audio output from at least one virtual speaker remote from and electronically unconnected with the sound source by emitting ultrasonic sound from at least one parametric speaker and oriented toward at least one reflective surface within the room which is remote from the sound source and not along the primary audio path, thereby indirectly generating sound from the reflective surface which is perceived as originating at the virtual speaker; and c) synchronizing the primary audio output of the audio speakers with the secondary audio output from the at least one parametric speaker such that the listener hears a coordinated enveloping sound experience from multiple directions.

In a further more detailed aspect, the present invention is further represented in an embodiment for providing multiple speaker locations around a listener. The device includes frontal audio speakers coupled to the sound source which are adapted for orientation along a primary audio path directly toward the listener, and at least one parametric speaker positioned and oriented toward at least one reflective surface within the room which is remote from the sound source and not along the primary audio path. The at least one parametric speaker provides nonfrontal audio output for developing at least one virtual speaker remote from and electronically unconnected with the sound source. In addition, a synchronizing circuit is provided for coordinating the frontal audio output of the audio speakers with the nonfrontal audio output from the at least one parametric speaker such that the listener hears a coordinated enveloping sound experience from multiple directions.

A further embodiment of this invention is represented by a parametric speaker which projects ultrasonic output to a reflective surface (forming a first virtual speaker) which is substantially nonabsorbing in the ultrasonic bandwidth, thereby providing a substantial reflection of the ultrasonic output along a second reflection which generates a second, time-delayed virtual speaker with respect to a second reflective surface.

Further more detailed aspects of the invention include providing a primary audio output of at least two channels of stereophonic sound and a secondary audio output of at least two channels. At least one of the virtual speakers used in a secondary output can be a side wall of a room or other enclosure wherein the listener is positioned. Ceiling, floor and front and back walls can also be used. Lateral movement of the virtual speaker can be provided for, to give rise to a moving sound source, for example, around a room. In another more detailed aspect, the audio outputs can be coordinated with a visual display to provide a heightened realism for a listener. In further detail, the virtual speaker can be provided at two locations, by directing columnar ultrasonic sound at a first surface to produce reflected audio-frequency sound and reflected columnar ultrasonic sound, the reflected columnar sound traveling to a second reflective surface, and there producing at least reflective audio-frequency sound. In further detail, the shape of the reflective surface, and the materials used, can be configured to alter the frequency response of the virtual speaker, and this can provide desired modification at the virtual speaker. In further detail, the audio source signal can be pre-processed to provide for a desired audio output at a virtual speaker comprising a surface. In another more detailed aspect, a reflected columnar ultrasonic sound projection and two reflective surfaces can be used to provide a time-delayed reflective sound simulating an echo from a first sound source. In further detail, the parametric speaker output can be directed to different locations in a controlled manner to provide sound sources at discrete locations and/or moving sound sources. In a further detailed aspect, the system can be used to distract a persons attention to a particular location comprising a reflective surface comprising a virtual speaker.

Other features of the present invention will be apparent to those skilled in the art, in view of the following detailed description, taken in combination with the accompanying drawings.

DETAILED DESCRIPTION

It is known that parametric speakers can provide a highly directional beam of ultrasonic frequency emission which, when modulated with an audio signal, creates multiple ultrasonic frequencies. In accordance with principles of acoustic heterodyning in parametric speakers, two ultrasonic frequencies whose difference falls within the audio range will interact in air as a nonlinear medium to produce an audio difference tone. This phenomenon produces an audio sound column including the modulated audio signal which is also highly directional. When this parametric sound column is reflected from a wall or other surface, a virtual speaker or sound source develops at the point of reflection. This general principle has been discussed in the respective parent patents cited above.

Figure 1:
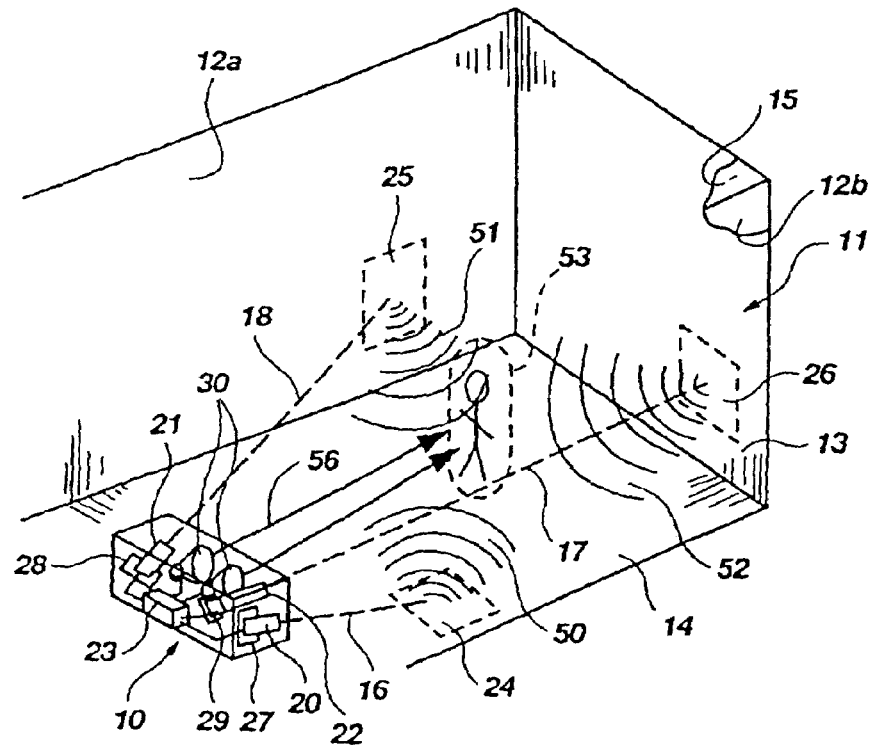
FIG. 1 is a schematic perspective diagram illustrating one embodiment of the invention in home theater applications.

Specifically, parametric speakers can be combined with a conventional sound system, as is shown in FIG. 1, to provide virtual speakers which will be perceived as sound sources at various points of reflection of projected ultrasonic beams. When applied as part of a surround-sound system, parametric speakers eliminate the need for positioning actual speakers at the various side and back locations, as well as eliminating associated wiring to the sound signal source.

With reference to FIG. 1, a sound system 10 including conventional components and parametric speakers is positioned at a frontal location in a typical room 11 or other enclosure. In one embodiment of the invention, the sound system is incorporated as part of a home theater system incorporating video in combination with numerous audio effects including shifting directions of sound source. Room dimensions will obviously vary but typical installations are represented by width and length dimensions of approximately 15×20 feet. Two opposing side walls 12a, 12b (12b shown partially in cut-away) are separated by a back wall 13. A floor 14 of the room 11 and a ceiling 15 (shown partially in cut-away) are separated by a typical distance of 7 to 10 feet. This typical arrangement is only one example of an installation, provided to illustrate the present invention.

The sound system 10 includes parametric speakers 20, 21 and 22. Ultrasonic sound control circuitry is housed in an audio amplifier system 23, along with other sound system components which power the conventional speakers 30. It will be apparent to those skilled in the art that other configurations for the combination of audio and parametric speakers can be applied, including separately powered and separately positioned systems, as may be appropriate, in another embodiment in a particular room configuration. Each parametric speaker 20, 21, 22 includes means for directional alignment, as described below, configured for directing each parametric output toward a desired virtual speaker position 24, 25 and 26, respectively, comprising reflective areas on the walls, floor or ceiling of the room 11. These reflective areas have been represented by regions within phantom lines in the figure. However, these boundaries are merely suggestive of examples of surface areas on the floor, back wall, ceiling and side walls, and may be shifted to virtually any reflective region (including, for example, furniture or fixtures within the room) which will provide the desired orientation of sound source to the listener.

Figure 2:
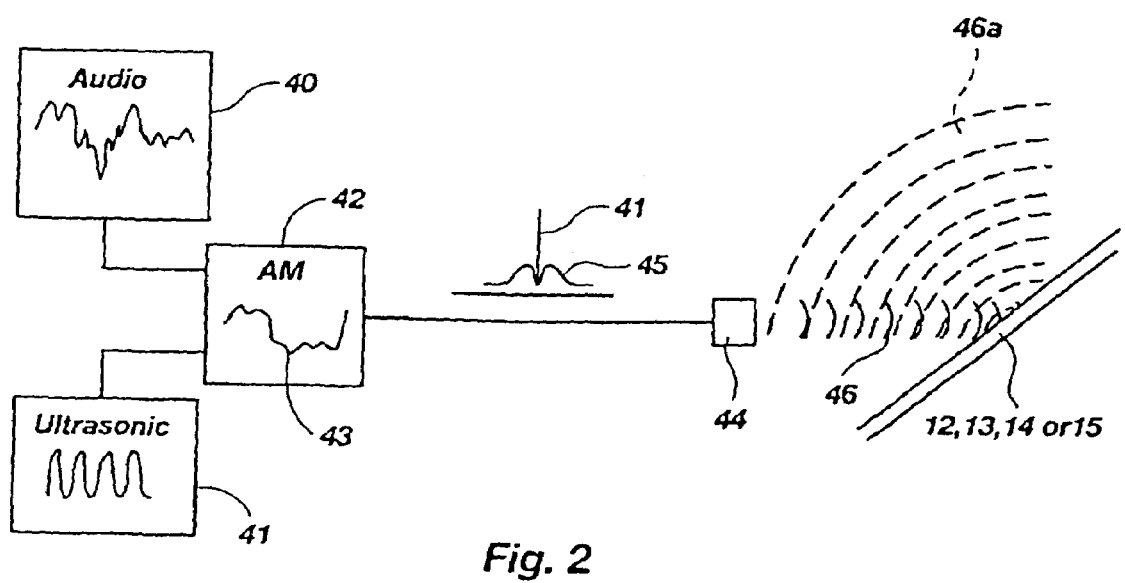
FIG. 2 is a schematic/block diagram of an exemplary system implementing the invention.

A specific process of realizing a virtual speaker location begins with emission of a heterodyning sound column in accordance with procedures outlined in the respective parent patents referenced above. This process is generally represented in FIG. 2 and with reference to that figure, i.e., involves the mixing of: a (i) desired audio signal 40, which is to be projected to the reflective surface, with (ii) an ultrasonic carrier wave 41, typically within the range of 25 Khz to 60 Khz, by means of amplitude modulation 42 or another appropriate process to generate a combined wave form 43 comprising the ultrasonic carrier wave and one or more sidebands 45. This signal of two or more ultrasonic frequencies whose difference in value corresponds to the audio input is projected into surrounding air by an ultrasonic emitter 44 and is decoupled as audio output 46 by the air as a nonlinear medium. Because of the highly directional nature of such parametric speakers, listeners outside the general direction of ultrasonic projection will not hear the stronger emitted audio sound waves until reflected from a wall, floor or ceiling 12, 13, 14 or 15. Once reflected, however, at least a portion of the audio sound disperses in a generally omni-directional pattern 46a, with the apparent source of the sound being the reflected surface which is typically distant from the actual emitter source.

With reference to FIGS. 1 and 2, it will be apparent, therefore, that the location of the virtual speaker 24, 25, or 26 will be a function of the directional orientation of the parametric speakers 20, 21, or 22. Such orientation may be fixed where the system is designed to provide a particular audience (not shown) with predetermined audio/visual is material, or may be controlled by servo systems 27, 28, or 29 which are coupled to the respective emitters. Such systems can be gimbals or other mechanical pivoting devices, or can comprise electronic beam steering circuits which alter the direction of a resulting propagation "path" of sound energy based on changing the phase relationship between groups of emitters within the parametric speaker 20, 21, or 22. Alignment with a desired orientation would then be a function of providing positional data to the servo system either by preprogrammed control signals which are coordinated with a specific audio or visual presentation, or other form of responsive control. The spatial inter-relationships of the emitters and walls (and any fixtures or furniture comprising reflective surfaces) can be accounted for in control software to provide virtual speakers at reflective surfaces at desired locations.

It will be recognized that in one embodiment the invention operates in a two-stage process. The first stage involves the generation and control of a focused beam of sound energy comprising the ultrasonic carrier signal with attendant sideband signals for generation of the audio sound column which emerges within the focused beam of ultrasonic energy. The second stage is to reflect the resulting sound column from a reflective surface 12, 13, 14 or 15 to generate the virtual speaker. The actual frequency of the carrier signal can and typically will be a function of desired distance from the emitter to the reflective surface. Inasmuch as lower ultrasonic frequencies provide longer range, the preference for 40 to 60 Khz has earlier been stated. Lower frequencies down to 30 Khz or even 25 Khz will further extend the propagation of the ultrasonic energy. Higher frequencies may be desirable for shorter distances; however, ultrasonic energy dissipation and/or absorption increases rapidly as frequencies approach 100 Khz or more.

It is important to distinguish the meaning of the term "propagate" as used in connection with parametric speakers disclosed herein, versus the use of that term as applied to audio compression waves emitted from a conventional (dynamic, electrostatic, planar magnetic) audio speaker. With respect to parametric speaker systems, and in particular in connection with development of virtual speaker technology, the term propagate has its more express dictionary meaning of "increasing in amount", rather than merely being "transmitted". As an example, audio compression waves decrease in sound pressure level (SPL) with increased distances of transmission. This fact is apparent as sound volume heard at increasing distances becomes softer to the listener. Essentially, the energy of the compression wave is attenuated by the air molecules, as they absorb the audio energy and decrease the audio volume.

Figure 3:
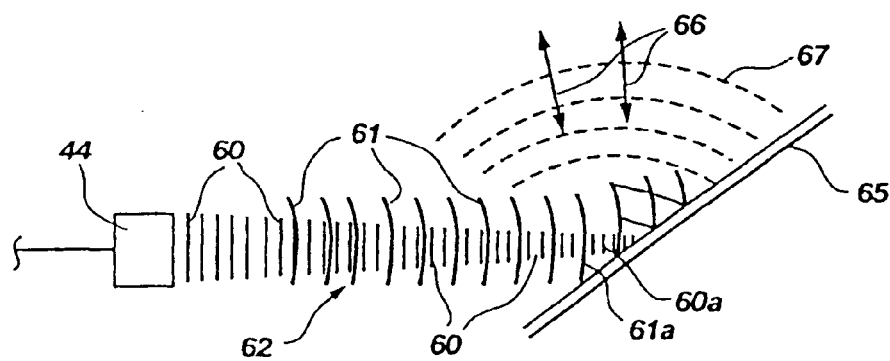
FIG. 3 is a diagram graphically illustrating a parametric emission in combination with a substantially absorptive surface area which limits reflection of ultrasonic radiation.

In contrast, in parametric propagation the air molecules generate the audio compression waves, based on their nonlinear interaction with the emitted ultrasonic waves. As a result air molecules in the parametric beam of energy provide energy conversion along the beam length to supply and increase the audio output of the speaker, rather than diminish signal strength. As is shown in FIG. 3, the ultrasonic energy 60 is transmitted in the air for a sufficient distance to allow the audio output 61 to increase until it becomes sufficiently strong to generate compression waves which continue along the parametric beam or column 62. With the ultrasonic and audio waves extending in the same direction within the column, the continued nonlinear interaction between the air and ultrasonic frequencies reinforces and strengthens the audio output. However, the ultrasonic energy is being dissipated as it travels outward, so eventually there is a decrease in audio wave array with distance. It is important, therefore, from an efficiency standpoint, to coordinate frequency and distance to the reflective surface so that audio-frequency wave energy is maximized at substantially the same location as the virtual speaker comprising the reflective surface.

Accordingly, in a parametric audio beam, the audio portion is not merely being "transmitted" as with conventional speakers, but it is being increased and enhanced in strength. It should be understood, therefore, that as used within this description within the context of parametric and virtual speakers, "propagate" has the specific meaning of transmission of an increasing amount of audio energy, rather than a transmission of decaying sound. Such propagation is a byproduct of the continued interaction of the ultrasonic energy within the sound column, adding amplitude to the audio component of the column as the column length extends. This is graphically represented by the greater width of compression waves 61a toward the end of the sound column of FIG. 3, but it will be apparent that the graphic does not necessarily correspond with spatial distribution of sound energy in the beam.

As alluded to above, because ultrasonic energy is more readily dissipated and/or absorbed within air than are lower (e.g. audio) frequencies, frequency selection is an important factor in development of virtual speaker sources. Frequencies of over 100 KHz quickly dissipate in air, and supply very little column length for the development of audio output in a parametric system. The greatest transmission distance for ultrasonic frequencies will be realized in the lowest range of 25 KHz to 40 KHz. Therefore, where longer propagation distances are desired, lower frequencies are required, typically less than 50 to 60 KHz. This introduces an important element for the generation of the second stage of the process, relating to the development and design choices of the virtual speaker aspect at the reflecting surface 65.

FIG. 3 illustrates use of a relatively higher frequency of ultrasonic energy, causing more rapid decay of the ultrasonic component of the sound column 62. One advantage of the higher frequency is greater energy for conversion to the audio component. Therefore, the audio signal 61 is illustrated with rapid growth with wave amplitude enlargement 61a. In one embodiment, as the diminished ultrasonic component 61a reaches the reflective surface 65, the balance of ultrasonic energy is substantially absorbed, reflecting only the audio component of the column. The use of a reflective surface which absorbs the ultrasonic emission (or does not, as described below) demonstrates a unique design feature of virtual speakers in accordance with the invention. Specifically, the audio reflection which is substantially free of further ultrasonic energy tends to create a source of sound which provides to a listener a perceived direction of audio source 66, but without as specific a perceived point of origin. This reflected audio wave energy 67 grows weaker with distance in the same sense that conventionally produced sound transmission decays with distance through the air.

Figure 4:
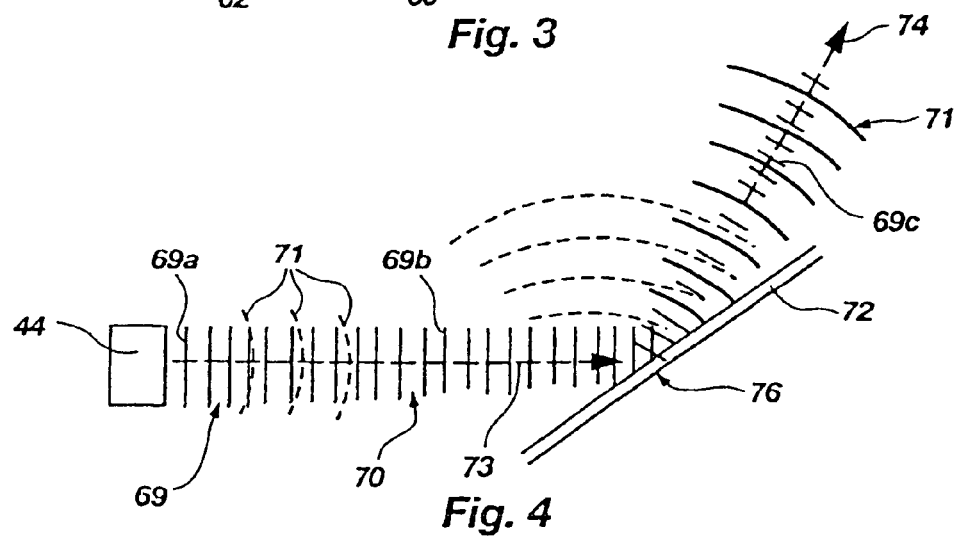
FIG. 4 is a diagram graphically depicting a parametric emission and use of a reflective surface which is substantially nonabsorbing in the ultrasonic range, providing reflection of ultrasonic emissions along with audio sound.

In another embodiment, the virtual speaker provides reflection of the ultrasonic component 69 of the sound column 70. This is illustrated in FIG. 4. The increasing audio component 71 has been illustrated in dashed lines and partially omitted only the first portion of the column (before reaching the reflective surface 72), to enable clear representation of ultrasonic reflection at an ultrasonically nonabsorbing surface 72. It should be understood that the audio component 71 continues to increase along a first direction 73 of the sound column 70 to the point of reflection at surface 72. This embodiment utilizes a lower ultrasonic frequency (25 to 40 Khz) enabling increased length of propagation of the parametric output. Accordingly, attenuation of the ultrasonic SPL represented by respective ultrasonic waves 69a, 69b, and 69c enables reflection of the ultrasonic energy from surface 72 and along a new direction of propagation 74.

The virtual speaker effects of the embodiment illustrated in FIG. 4 are both unusual and surprising. Instead of creating a perceived general direction of sound source as represented by a line 66 in FIG. 3, the embodiment shown in FIG. 4 provides a point source of perceived origin 76 for the sound. Specifically, with reference to FIG. 3, when aiming a parametric speaker emitter 44 at a surface 65 which has substantial ultrasonic absorption (approximately 6 to 15 dB or more), the audio reflection from the surface does not have a particular virtual source point; but instead, sound is perceived to be coming from that general direction. Also, the perceived sound is at a lower intensity than in the ultrasonically reflective case. Further, there is less continuation of the sound in a "coherent" form. The sound seems to dissipate and spread from the point of reflection in a random fashion rather than continuing in a substantially columnar fashion.

With reference to FIG. 4, when the ultrasonically reflective surface 72 is used, the ultrasonic energy 69 reflects off the surface and remains columnized to a greater degree. Since, as discussed, the audio 71 generated from a parametric loudspeaker is caused by an interaction of ultrasonic wave forms and achieves greater output as the ultrasonic energy portion adds more to the audio column portion over distance, the columnated ultrasonic energy reflecting off a substantially non-absorptive surface will continue to add to the parametric audio output and strengthen the reflected audio column of sound. This allows the audio not only to maintain strength over a greater distance after reflection, it also allows an increase in directional energy to continue, even though some of the reflected energy can also be heard as audio at various angles from the virtual speaker.

It has been found that a level increase of 6 dB or more in audio sound pressure level can be obtained off the reflection if the original ultrasonic signal is substantially unabsorbed at the point of the virtual speaker or reflection. Furthermore, that 6 dB or more of increase can be heard continuing around the environment to secondary reflections, enabling multiple virtual speakers in a way not possible if ultrasonic absorption is used at the reflection/virtual speaker location. For example, with reference to FIG. 5, a parametric sound column 18a is first reflected from a wall surface location 25a, and from there along a second direction 18b to a second surface 26a, both of which are substantially ultrasonically nonabsorbing surfaces.

Accordingly, a preliminary definition of an ideal virtual speaker in one embodiment is suggested as follows: a passive surface reflection which interrupts the directional orientation of a parametric sound column having a significant near field condition of energy enhancement. Ideally, the parametric sound column is reflected with a substantial level of ultrasonic energy which continues to decouple in the air both before and after reflection. In this sense, audio output is being enhanced along the column length both before and after reflection. Based on this model, the virtual speaker or reflective surface is literally producing a growing audio emission, just as a conventional speaker generates enhanced sound propagation as more energy is added to surrounding air at the speaker source.

Applying this unusual "point source" virtual speaker concept enables a much more refined audio environment in surround-sound applications. Point sources are more readily noticed and provide a greater sensory response from the brain. Point source definition also increases the versatility of the surround-sound system because multiple point sources can be established from a single beam of sound, thereby increasing the sensory response. Furthermore, if safety concerns exist for exposure to ultrasonic emissions, a preferable method would be to reduce the intensity of ultrasonic radiation into the listening area by use less power and/or of lower frequency and an ultrasonic nonsorbative surface to reflect the energy, thereby providing a longer path and greater opportunity to generate audio with less generated ultrasonic energy. One can thereby reduce the ultrasonic levels of exposure, while producing the desired virtual speaker effect. This provides greater efficiency and use of less ultrasonic amplifier power and less ultrasonic radiated energy to achieve substantially the same audio levels.

Figure 5:
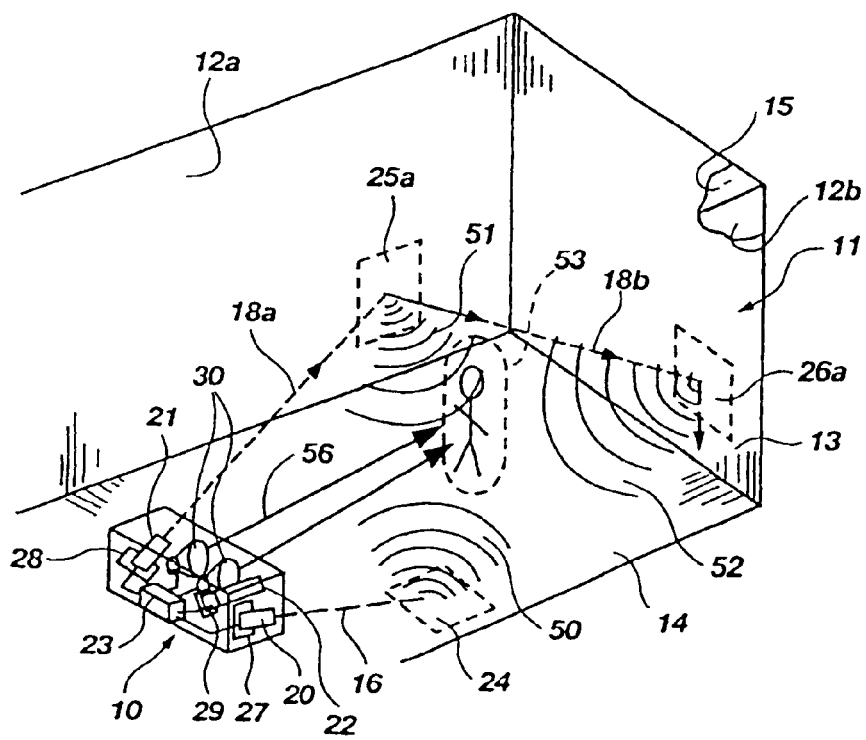
FIG. 5 is a schematic perspective diagram providing a graphic illustration of a surround-sound system utilizing substantially nonabsorbing surfaces at ultrasonic frequencies to generate multiple, time-delayed virtual speakers from a single parametric speaker.

Accordingly, with reference to FIGS. 3, 4 and 5, the second stage of the process of converting the focused beam of sound to a diffuse, omni-directional pattern can be accomplished in several ways. In one case, the virtual speaker may be from a surface 65 which has some degree of ultrasonic absorption. In this embodiment, there will be diminished sound level, which is strongly attenuated with distance from the reflective surface. The perception of sound source will be of it coming from a general direction extending from that surface. A second method is to use a nonabsorptive surface 72 which reflects ultrasonic emissions, and to provide a frequency range that will enable substantial reflection from that surface for both the audio and ultrasonic components of the parametric sound column. This embodiment of the invention creates a localized sound source of origin, with sound propagation having increasing SPL along the column for the audio component. Multiple reflections can be accomplished, creating multiple virtual speakers providing time delayed exposure to the respective virtual speaker outputs.

In both cases, the unique features of a virtual speaker are realized at a distance from the actual sound source. This includes the effect of defining the apparent sound source as the virtual speaker because the human ear is accustomed to associating an omni-directional sound source as being the natural source or center of evolution for emanating sound. As a parametric sound output beam 16, 17 or 18 encounters the reflective wall 12 or 13, floor 14 or ceiling 15 surface, it has been observed that the focused beam actually converts to the desired onmi-directional pattern (50, 51, or 52 in FIG. 1) or with an omni-directional, point source pattern at reflective surfaces (25a and 26a in FIG. 5). Normal auditory senses now ascribe the various reflecting sound waves of generally omni-directional nature arriving at the listener to be associated with the virtual speaker. Sound emissions from the parametric output of the first stage do not interfere with this sensory process because they remain in the focused columns 16, 17 and 18 which are oriented to be outside a listener location 53.

With reference to FIGS. 1 and 5 in an embodiment of the invention, this specific process is represented in the following general method for providing multiple speaker locations around a listener in a room having an actual sound source being positioned at one or more locations. This method includes the initial step of: a) generating primary or frontal audio output by emitting audio compression waves from audio speakers 30 at a first location, which can be the location of the sound source 10, which waves are projected along a primary audio path 56 directly toward the listener location 53. This is consistent with a conventional sound system, and would typically include a full range speaker array, having woofer, midrange, and tweeter devices oriented toward the user. Such sound would project toward the user, and would be generally reflected throughout the room. In this configuration, all sound would be perceived as emanating from the first location comprising the sound source 10.

Another step (which can be a concurrent step) of the process includes generating secondary or nonfrontal audio output 50, 51, and/or 52, from at least one virtual speaker 24, 25 and/or 26 remote from, and electronically unconnected with, the frontally located conventional speakers 30 and the sound source 10. This is accomplished as described above by emitting ultrasonic sound from at least one parametric speaker 20, 21, and/or 22 positioned at the sound source or at one or more other separated locations and oriented toward at least one audio-reflective surface within the room which is remote from the sound source and not along the primary audio path, thereby indirectly generating omni-directional sound 50, 51, and/or 52 from the audio-reflective surface which is perceived as originating at the virtual speaker.

Synchronizing the frontal audio output 56 of the audio speakers with the nonfrontal audio output 16, 17, and 18 from the at least one parametric speaker may be necessary or desired such that the listener hears sounds from multiple directions to provide a coordinated enveloping sound experience. For example, distances of the primary audio path 56 will need to be coordinated with the greater and shorter distances traveled by the sound columns 16, 17, 18 and omni-directional paths 50, 51 and 52 to the listener location. Appropriate time delays can be implemented within a primary control circuitry of a controller/amplifier/processor 23. Similarly, synchronizing signals may be desired for isolated audio effects which are momentarily emitted, seeming to originate at any one or more of the audio-reflective surfaces 24, 25, 26; for example, to simulate a crash, bolt of lightening, or other audio feature having a nonfrontal directional component. These timing techniques are well known in the audio industry and do not themselves require further explanation.

This basic method is typically implemented with advanced fidelity and stereo features comprising the sound source of conventional speakers 30. This stereophonic format generally embodies the frontal audio output with at least one first channel, and the nonfrontal audio output with at least one second channel. Normally the stereophonic format includes two or more separate channels of stereophonic sound for both the frontal audio output and the nonfrontal audio output. These multiple channels are used to provide division of left-right stereo output, front-back stereo output, and isolation of audio features which may be spread across reflective surfaces throughout the room.

As part of this method, various combinations of conventional speaker 30 and virtual speaker 24, 25, 26 selection may easily be accomplished as a choice of electronic control and activation through the control circuitry 23. These combinations are represented in part by a single virtual speaker 25 at a side wall 12 with respect to the primary audio path 56, a single virtual speaker 26 at a back wall with respect to the primary audio path, a single virtual speaker (not shown) at a ceiling surface 15 or a single virtual speaker 24 at a floor surface. Concurrent operation of virtual speakers at opposing side walls 12a, 12b relative to the primary audio path, as well as virtual speakers at respective side and back 13 walls relative to the primary audio path are part of a surround-sound system, and may be conveniently implemented with the present invention, along with other combinations of virtual and/or conventional speakers.

A significant feature of the invention is the ability to incorporate slow or rapidly moving virtual speaker locations along any of the audio-reflective surfaces comprising walls, floors, ceilings, panels, furniture, etc. For example, lateral movement of the parametric device 20, 21, or 22 develops a concurrent displacement of the virtual speaker along a reflective surface at which it is pointed and will provide a sensation of motion for the listener. When combined with a video projection system, these nonfrontal audio output features can be coordinated with events represented on a video display. A streaking jet, roaring train or exciting car chase can be enhanced with directional sound from many orientations which emphasize a full range of dynamic activity. This not only generates an exhilarating sensory response with the listener, but enlarges the experience with a three-dimensional sense of depth within the room.

The phenomenon of virtual speakers 24, 25, 26 using parametric technology is revealing other peculiarities and applications for use associated with reflection of parametric sound output, such as described in the parent patent cases of this application. Although several of these have been addressed in this and the parent applications, numerous other possible applications will be apparent to those skilled in the art. The inventors perceive that these applications include features that constitute properties which collectively form a body of technology relating uniquely to virtual speakers. For example, it has been discovered that audio frequency response will most often be altered when reflected from the surface defining the virtual speaker source. Specifically, the frequency can be modified by surface absorption of the ultrasonic and/or audio component. It can also be modified by the shape of the reflecting surface. For example, in one embodiment by using a convex reflective surface and, therefore, spreading or disbursing all audio frequencies, including the high frequencies, the fall-off rate of the higher frequencies are increased, changing the balance of the perceived sound.

The ultrasonic high frequency component may need special processing or restoration based on the effects of the reflective surface. Special adaptation of the parametric speaker components can be implemented to preprocess the parametric output to implement such processing. Similarly, low frequency parametric efficiency may be hindered with propagation from the virtual speaker. This arises from the fact that conversion of ultrasonic energy to audio output may not be uniform across the audio bandwidth. For example, directional low frequency generation may require a greater length of the parametric sound column, as compared to higher audio frequencies. Also, diffusion of the ultrasonic component of the column may reduce post reflection ultrasonic intensity and affect the balance between reflected audio output versus converted audio output. Accordingly, equalization techniques can be applied to restore a desired audio balance. Furthermore, the act of reflection through a virtual speaker may cause multiple amplitude errors across the desired audio band and demand multiband equalization to restore the desired acoustical spectral balance. This may be particularly so if there is selective frequency absorption at the reflection point.

On the positive side, it should be noted that use of a parametric speaker in the virtual mode develops reflection and dispersive qualities that tend to balance the parametric system to compensate for the 12 dB per octave high pass characteristic in direct (as opposed to virtual) parametric propagation. This phenomenon provides enhanced warmth to the audio output, developing a more natural sound.

It is also believed that this new field of technology will become of greater significance with the evolution of parametric technology as applications diversify beyond current utilities found within the audio industry. For example, the concept of a virtual speaker can be used by military and law enforcement personnel to avoid a responsive attack to sounds which would otherwise identify one's location. Police officers are required to give a verbal warning to a person, who may be a criminal, which often leads to weapon fire in the direction of the source of the warning. Utilization of a parametric system with a virtual speaker reflected from another direction would lead to weapon fire away from the officer. In this manner, a person, such as a criminal, is distracted toward the virtual speaker, allowing the officer an increased margin of safety, and/or to approach without notice and with an element of surprise.

It is to be understood that the foregoing illustrations are offered as examples of the present invention, and are not intended to be limiting, except as defined in the following claims. Other variables will become apparent to those skilled in the art, based on the principles set forth in this disclosure.

The invention claimed is:

1. A method for generating at least one remote virtual speaker location in connection with at least a partial reflective environment and in combination with an audio speaker for creating a plurality of sound effects including a virtual sound source from the reflective environment which is perceived by a listener as an original sound source, said method comprising the steps of:
   a) generating a primary, direct audio output by emitting audio compression waves from audio speakers, thereby providing direct audio output to a listener;
   b) generating secondary, indirect audio output from at least one virtual speaker remote from the audio speakers by emitting ultrasonic sound from at least one parametric speaker associated with the audio speakers and oriented toward at least one reflective environment which is remote from the audio speakers, thereby indirectly generating generally omni-directional sound from the reflective environment which is perceived as a virtual speaker;
   c) synchronizing the primary audio output of the audio speakers with the secondary audio output from the at least one virtual speaker such that the listener hears a plurality of sound effects from multiple directions;
   d) providing reinforced propagated sound from a virtual speaker at a separate location from a sound source which originates the propagated sound;
   e) emitting parametric ultrasonic output including modulated ultrasonic and audio frequencies from a parametric emitter along a primary direction of propagation;
   f) orienting the primary direction of propagation toward a reflective environment having surface properties which enable substantial reflection of the ultrasonic output along a secondary direction comprising an indirect path to the listener; and
   g) providing reinforced propagation of audio sound from the reflective environment comprising (i) a reflected audio component and (ii) a reflected ultrasonic component including the parametric ultrasonic output which decouples along the secondary direction within air to reinforce the reflected audio component, thereby developing a virtual speaker along the secondary direction with respect to the listener.

2. A method as set forth in claim 1, comprising the further step of providing independent format wherein the primary audio output comprises at least one first channel, and the secondary audio output comprises at least one second, independent channel.

3. A method as set forth in claim 2, comprising the further step of providing a stereophonic format wherein the primary audio output includes two separate channels of stereophonic sound, and the secondary audio output comprises at least two channels of independent sound separate from the channels of the primary audio output.

4. A method as set forth in claim 1, comprising the additional step of positioning at least one virtual speaker at one of a) a side wall, b) a back wall, c) a ceiling surface, and d) a floor surface, of a room enclosure as the reflective environment.

5. A method as set forth in claim 1, further comprising the step of providing lateral movement of the at least one virtual speaker along the reflective surface to provide a sensation of motion for the listener.

6. A method as set forth in claim 1, comprising the additional steps of concurrently operating a video projection system in combination with the at least one virtual speaker and coordinating secondary audio output with events represented on a video display.

7. A method as set forth in claim 1, further comprising the step of modifying frequency response of the reflected audio component by at least one of: a) configuring the shape of the reflective surface in accordance with a predetermined frequency response; and b) configuring the absorption properties of the reflective surface in accordance with a predetermined frequency response.

8. A method as set forth in claim 1, further comprising the step of modifying the reflected audio output by preprocessing the modulated ultrasonic and audio frequencies to compensate for changes imposed on the reflected audio output as a result of reflection by the reflective surface.

9. A method as set forth in claim 8, wherein the modifying step is implemented to adjust for at least one of: a) ultrasonic absorption at the reflective surface; b) audio absorption at the reflective surface; c) changes arising from surface configuration at the reflective surface; d) changes arising from nonuniform conversion of ultrasonic energy to audio output across the audio bandwidth at the reflective surface; e) changes arising from nonuniform conversion of ultrasonic energy to audio output across the audio bandwidth along the primary direction of propagation; f) changes arising from nonuniform conversion of ultrasonic energy to audio output across the audio bandwidth at the reflective surface; and g) changes in reflected audio output arising from diffusion of ultrasonic energy at the reflective surface which reduces post reflection intensity of the ultrasonic component.

10. A method as set forth in claim 1, further comprising the step of propagating a combined parametric sound column of ultrasonic and audio output from a first reflective surface to a second reflective surface, thereby generating a second virtual speaker which provides audio output which is time delayed from the first virtual speaker.

11. A method as set forth in claim 1, further comprising the step of positioning the parametric emitter proximate to at least one of: a) the audio speakers; b) a video projection device; and, c) between the audio speakers and the virtual speaker.

* * * * *